United States Patent
Enguent

(10) Patent No.: US 7,603,082 B2
(45) Date of Patent: Oct. 13, 2009

(54) IMPEDANCE MATCHING OF AN ELECTROMAGNETIC TRANSPONDER READER

(75) Inventor: Jean-Pierre Enguent, Saint Savournin (FR)

(73) Assignee: STMicroelectronics S.A., Montrouge (FR)

(*) Notice: Subject to any disclaimer, the term of this patent is extended or adjusted under 35 U.S.C. 154(b) by 639 days.

(21) Appl. No.: 11/165,407

(22) Filed: Jun. 23, 2005

(65) Prior Publication Data

US 2005/0285718 A1 Dec. 29, 2005

(30) Foreign Application Priority Data

Jun. 23, 2004 (FR) .................................. 04 51316

(51) Int. Cl.
*H04B 5/00* (2006.01)
*H04B 7/00* (2006.01)

(52) U.S. Cl. ................. 455/39; 455/41.1; 455/41.3; 455/127.1; 455/129; 455/558; 340/10.3; 340/572.7

(58) Field of Classification Search ....... 455/41.1–41.3, 455/121–123, 129, 557–558; 340/10.1, 10.3, 340/10.4–10.51, 572.7
See application file for complete search history.

(56) References Cited

U.S. PATENT DOCUMENTS

| | | | | |
|---|---|---|---|---|
| 6,020,787 A | * | 2/2000 | Kim et al. | 330/279 |
| 6,070,803 A | | 6/2000 | Stobbe | |
| 6,427,065 B1 | * | 7/2002 | Suga et al. | 455/41.1 |
| 6,538,564 B1 | * | 3/2003 | Cole | 340/10.4 |
| 6,639,514 B1 | * | 10/2003 | Muller | 340/572.5 |
| 6,650,226 B1 | * | 11/2003 | Wuidart et al. | 340/10.1 |
| 6,703,921 B1 | * | 3/2004 | Wuidart et al. | 340/10.4 |
| 6,942,158 B2 | * | 9/2005 | Waters | 235/492 |
| 7,049,936 B2 | * | 5/2006 | Wuidart | 340/10.4 |
| 7,190,933 B2 | * | 3/2007 | De Ruijter et al. | 455/125 |
| 7,369,811 B2 | * | 5/2008 | Bellantoni | 455/41.2 |
| 7,379,714 B2 | * | 5/2008 | Haque et al. | 455/107 |
| 2004/0099738 A1 | | 5/2004 | Waters | |
| 2004/0233043 A1 | * | 11/2004 | Yazawa et al. | 340/10.3 |

OTHER PUBLICATIONS

French Search Report from French Patent Application No. 04/51316, filed Jun. 23, 2004.

* cited by examiner

*Primary Examiner*—Simon D Nguyen
(74) *Attorney, Agent, or Firm*—Lisa K. Jorgenson; James H. Morris; Wolf, Greenfield & Sacks, P.C.

(57) ABSTRACT

A terminal for generating an electromagnetic field, including an oscillating circuit capable of receiving a high-frequency A.C. excitation voltage via an amplifier and a directional coupler, the oscillating circuit having at least one element of variable capacitance, and circuitry for modifying the value of this capacitance according to the amplitude of a signal extracted from the coupler.

23 Claims, 1 Drawing Sheet

IMPEDANCE MATCHING OF AN ELECTROMAGNETIC TRANSPONDER READER

BACKGROUND OF THE INVENTION

1. Field of the Invention

The present invention relates to systems using electromagnetic transponders, that is, transceivers (generally mobile) likely to be interrogated, contactless and wireless, by a unit (generally fixed), called a read and/or write terminal. The present invention more specifically relates to read/write terminals of transponders with no autonomous power supply, which extract the power supply required by the electronic circuits included therein from a high-frequency field radiated by an antenna of the terminal.

2. Discussion of the Related Art

FIG. 1 very schematically shows in the form of blocks an electromagnetic transponder read terminal 1 and a transponder 10 intended to communicate with such a terminal.

On the read terminal side, a series oscillating circuit 2 formed of an inductance L1, forming an antenna, in series with a capacitor C1 (and generally a resistor R1), between an output terminal 3 of an antenna coupler 4 and a reference terminal 5, generally the ground, can be found. Coupler 4 receives from an amplifier 6 (PA) an excitation signal Tx provided by a modulator (not shown) of signals to be transmitted to transponder 10. The modulator belongs to circuits 7 (CIR) schematically shown in the form of a block comprising circuits for controlling the oscillating circuit and for exploiting data received from the transponder (among others, a modulator and a microprocessor for processing control and data signals). In the absence of data to be transmitted, the modulator of circuit 7 transmits a remote-supply carrier (generally at 13.56 MHz) directed to transponder 10. The junction point of capacitor C1 and of the inductance forms, in the example shown in FIG. 1, a terminal for sampling a data signal Rx, received from a transponder 10, and intended for a demodulator 8 (DEM). An output of demodulator 8 communicates the data received from the transponder to digital circuits 7 (generally, the microprocessor via a decoder).

To adapt the transmit power of the terminal, coupler 4 is generally used to sample an information proportional to the signal provided by amplifier 6 intended for a comparator 9 (COMP) controlling the gain of amplifier 6. This comparator compares, for example, the voltage sampled from a so-called CPLD terminal of coupler 4 with respect to a predetermined reference voltage Vref. In known fashion, a coupler 4, be it with coupled lines or local elements, comprises two terminals IN and DIR between which flows the main signal, and a terminal CPLD providing a proportional information. Generally, a fourth terminal ISO is left in the air or connected, by a resistor or a capacitor, to ground.

On the side of transponder 10, an inductance L2 in parallel with a capacitor C2 forms a parallel oscillating circuit (called a resonant circuit) intended to sense the magnetic field generated by the series oscillating circuit of terminal 1. Terminals 11 and 12 of the resonant circuit are connected to two A.C. input terminals of a (halfwave or fullwave) rectifying bridge 13 having their rectified output terminals 14 and 15 providing a supply voltage to circuits 16 (IC) of the transponder, generally via a capacitor, not shown, intended to store and smooth the voltage rectified by bridge 13. Electronic circuits 16 of the transponder generally essentially include a microcontroller and a demodulator of the signals possibly received from terminal 11. Circuit 16 receives a signal directly sampled across the oscillating circuit (for example, on terminal 11) to restore a clock signal from the remote-supply carrier provided by the terminal. Most often, all the electronic circuits of transponder 10 are integrated in a same chip, itself inserted in a smart card.

The transmission of data from transponder 10 to terminal 1, is performed under control of a stage of modulation (back modulation) of resonant circuit L2-C2. This modulation stage is generally formed of an electronic switch 17 (for example, a MOS transistor) and of a resistor R (or of a capacitor), in series between terminals 14 and 15 (or between terminals 11 and 12). Switch 17 is controlled at a so-called sub-carrier frequency (for example, 847.5 kHz), much smaller than the frequency of the excitation signal of the oscillating circuit of terminal 1. When switch 17 is on, the transponder's oscillating circuit is submitted to an additional damping with respect to the load formed by circuit 16, so that the transponder draws a more significant amount of power from the high-frequency magnetic field. On the side of terminal 1, amplifier 6 maintains the amplitude of the high-frequency excitation signal constant due to the control performed by coupler 4 and comparator 9. Accordingly, the power variation of the transponder translates as an amplitude and current phase variation in antenna L1. This variation is detected by demodulator 8 of terminal 1, generally an amplitude demodulator.

The resonant circuit (L2-C2) of transponder 10 and the oscillating circuit (R1-L1-C1) of terminal 1 are generally tuned to a same frequency which most often corresponds to the remote-supply carrier frequency.

The impedance of the oscillating circuit of terminal 1 is generally adapted to the output of coupler 4, said coupler further having an input impedance adapted to the output of amplifier 6. For the impedance of the oscillating circuit to be adapted to the output of coupler 4, the imaginary parts of the respective impedances of inductance L1 and of capacitor C1 must mutually cancel at the tuning frequency, and resistance R1 (plus the series resistance of inductance L1) must have the value of the output impedance of the coupler (generally, 50 ohms).

A problem of conventional read/write terminals is that in case of a mismatch of the impedance of the oscillating circuit's antenna, the signal received by the demodulator is disturbed.

Now, any element entering the terminal's magnetic field is likely to create an additional reactive element in this field and to then modify the impedance of the oscillating circuit.

Further, the tuning of the resonance frequency to the carrier frequency is performed manually by means of a variable capacitor C1, once the terminal has been manufactured. This need for adjustment of capacitor C1 is especially due to the manufacturing tolerances of the capacitive and inductive elements. Generally, capacitor C1 has a capacitance value tolerance on the order of 20% and antenna L1 is manufactured with a tolerance on the order of 10%. Such tolerances are incompatible with the fulfilling of tuning accuracy constraints. Similarly, such tolerances adversely affect the impedance matching between amplifier 6 and the oscillating circuit.

A manual adjustment of a capacitor C1 requires a maintenance operation once the terminal has been arranged in its definitive environment. Further, maintenance problems linked to the impedance matching drift according to environment modifications, for example, after temperature and/or humidity changes, can also be observed.

SUMMARY OF THE INVENTION

The present invention aims at overcoming the disadvantages of known systems and, in particular, at making the impedance matching stable even in case of a variation in the environmental conditions of terminal operation.

The present invention also aims at avoiding manual setting for an impedance matching of the antenna.

To achieve these and other objects, the present invention provides a terminal for generating an electromagnetic field, comprising an oscillating circuit capable of receiving a high-frequency A.C. excitation voltage via an amplifier and a directional coupler, the oscillating circuit comprising at least one element of variable capacitance, and a means for modifying the value of this capacitance according to the amplitude of a signal extracted from the coupler.

According to an embodiment of the present invention, said means is formed of a comparator comparing the voltage extracted from the coupled line of the coupler with a reference voltage selected to maintain the impedance of the oscillating circuit at a predetermined value.

According to an embodiment of the present invention, the oscillating circuit is formed of a capacitor, in series with an inductance and a resistor, the variable-capacitance element comprising a MOS transistor, controlled by said means and connected in parallel with the series connection of the inductance and of the resistor, the stray capacitance of the MOS transistor being used to modify the capacitance of the oscillating circuit.

According to an embodiment of the present invention, said coupler comprises discrete elements.

According to an embodiment of the present invention, the electromagnetic field remotely supplies at least one transponder.

The foregoing objects, features, and advantages of the present invention will be discussed in detail in the following non-limiting description of specific embodiments in connection with the accompanying drawings.

DETAILED DESCRIPTION

Figure 1:
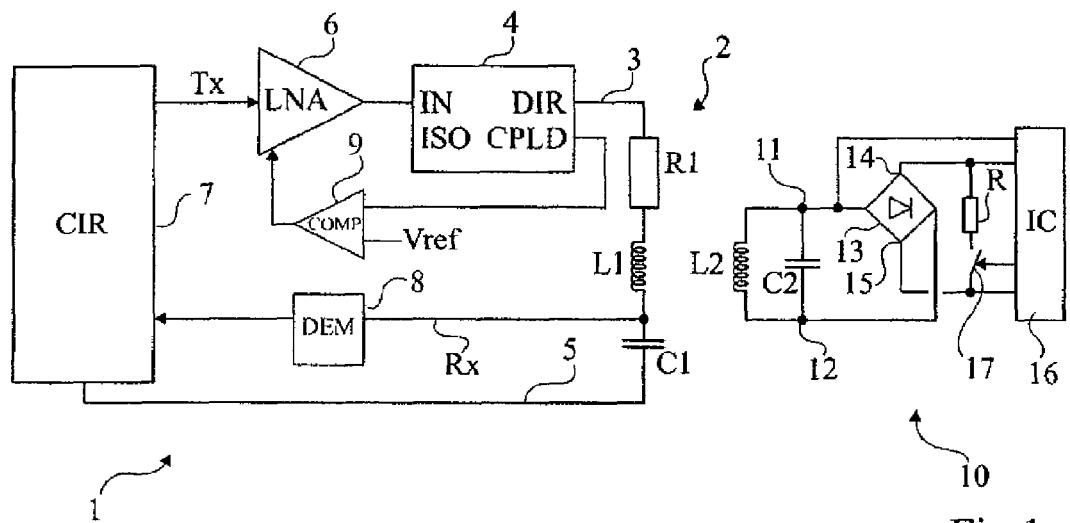
FIG. 1, previously described, very schematically shows the conventional architecture of a terminal and of a transponder to which the present invention applies.

For clarity, the same elements have been designated with the same reference numerals in the different drawings. Further, only those elements that are necessary to the understanding of the present invention have been shown in the drawings and will be described hereafter. In particular, the circuits for controlling and exploiting the transmitted and received data have not been described in detail. Further, the structure of a transponder has not been described in detail since the present invention requires no modification of conventional transponders.

A feature of the present invention is to use the information provided by an antenna coupler, interposed between an amplifier and the oscillating circuit of a read/write terminal of a transponder, to control the capacitive value of this oscillating circuit.

Figure 2:
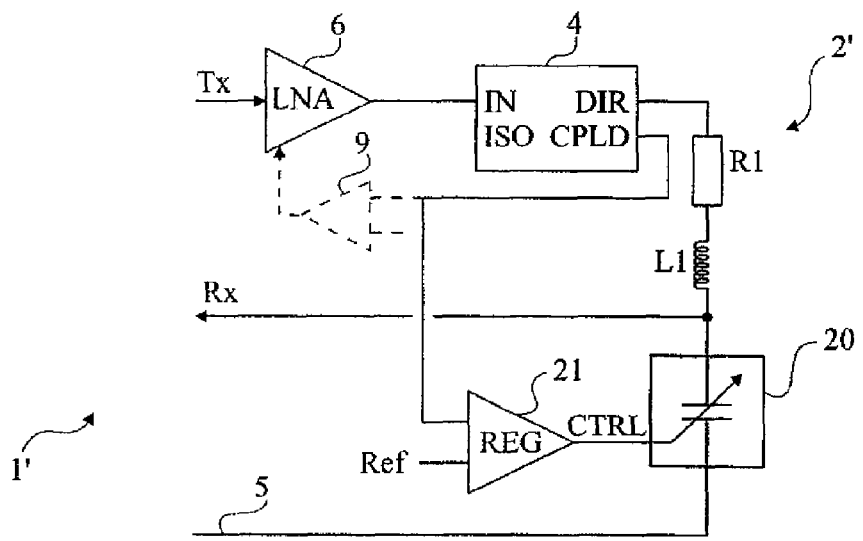
FIG. 2 partially shows a first embodiment of an impedance matching circuit of a terminal according to the present invention.

FIG. 2 partially and schematically shows a first embodiment of a read/write terminal 1' of an electromagnetic transponder (not shown) according to the present invention. Only part of the terminal's components have been shown in FIG. 2, the rest being similar to the structure of a conventional terminal such as illustrated in FIG. 1.

FIG. 2 shows an amplifier 6 (PA) for providing an excitation signal to an oscillating circuit 2' formed of a resistor R1, of an inductance L1, and of a capacitive element 20 in series, and a directional antenna coupler 4 connected between the output of amplifier 6 and oscillating circuit 2'.

According to the present invention, capacitive element 20 is a variable-capacitance element controllable by a signal CTRL. Signal CTRL is provided by a circuit 21 (REG) having the function of comparing the signal provided by antenna coupler 4 (terminal CPLD) with a reference value REF to control the value of the capacitance of element 20 to maintain the impedance of oscillating circuit 2' at a predetermined value. The information provided by antenna coupler 4 is further still used by a comparator 9 for controlling the gain of amplifier 6 to maintain the amplitude of the high-frequency excitation signal constant.

When the impedance of the oscillating circuit varies, for example, under the effect of environmental variations modifying the equivalent capacitance of the oscillating circuit, the amplitude of signal CPLD is modified. This variation is detected by comparator 21 (preferentially, analog) which causes a modification in the value of variable capacitance 20 in a direction such that it compensates for the disturbance in the equivalent capacitance, value REF being selected to bring the amplitude of the signal measured on terminal CPLD back to a predetermined nominal value which is a function of the desired impedance (for example, 50 ohms), set by the value of resistance R1 (plus the series resistance of inductance L1). Of course, another value than 50 ohms may be selected according to the output impedance of the coupler, which may have a non-unity impedance ratio between the output and the input.

The selection of reference value REF of circuit 21 depends on the characteristics of the coupler and of circuit 21 itself, and are within the abilities of those skilled in the art.

An advantage of this embodiment of the present invention is that the impedance control modifies the value of capacitive element 20 in the same direction as the variation required for maintaining the tuning to the remote-supply carrier frequency. In other words, the impedance is controlled at the same time as the tuning.

Figure 3:
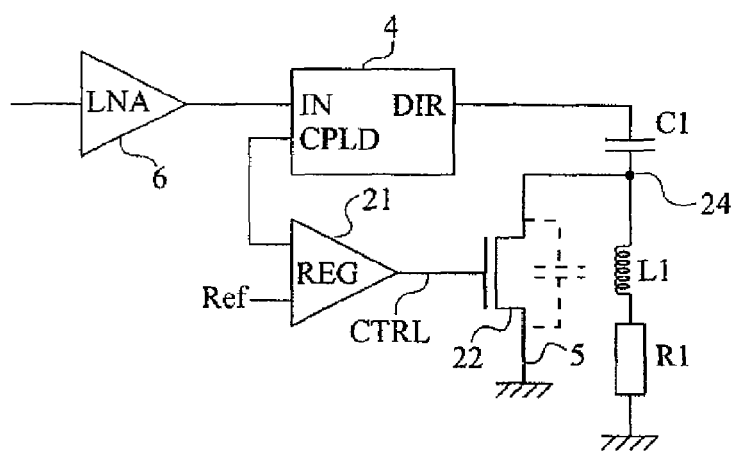
FIG. 3 shows a second embodiment of an impedance matching circuit according to the present invention.

FIG. 3 shows a second embodiment of a control circuit according to the present invention. In this example, circuit 21 providing control signal CTRL controls a MOS transistor 22 assembled in parallel on a series association of inductance L1 with resistor R1. Capacitor C1 being, for example, between this parallel assembly and output DIR of coupler 4 (as an alternative, between this parallel assembly and the ground if this is compatible with the control of switch 22). In this example, the respective positions of capacitor C1 and of inductance L1 have been inverted with respect to FIGS. 1 and 2. This has however no incidence upon the operation.

Preferably, received signal Rx is sampled from output CPLD of the coupler, which improves the signal-to-noise ratio. Such a connection is also possible in the embodiment of FIG. 2. The only precaution is for the time constant of the regulation loop to be much greater (at least ten times) than the back-modulation period to avoid loosing the back-modulation information.

According to the embodiment of FIG. 3, resistor R1 is in series with inductance L1 between junction point 24 with transistor 22 and the ground. The stray capacitance of MOS transistor 22 is in parallel with series association L1-R1 and is used to modify the impedance of oscillating circuit 2'.

According to an alternative, an additional capacitor grounds junction point 24.

An advantage of the embodiment of FIG. 3 is that it enables modifying the quality factor Qs (Qs=ωL1/(Rs+R1), where Rs designates the series resistance of inductance L1 and where ω designates the tuning pulse) independently from the impedance matching. Resistor R1 may, for example, be made variable to adapt the quality factor according to resistance Rs.

An advantage of the present invention is that it enables automatic matching of the impedance of an oscillating circuit according to its environment.

Another advantage of the present invention is that it avoids manual setting of its components for impedance matching or tuning purposes.

Another advantage of the present invention is that this matching does not adversely affect the rest of the terminal's operation. Conversely, this improves the capacitance of its demodulation circuit 8.

Of course, the present invention is likely to have various alterations, modifications, and improvements which will readily occur to those skilled in the art. In particular, the selection of the reference value on which the voltage derived from coupler 4 is to be controlled depends on the application and especially on the parameters of the actual coupler.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A terminal for generating an electromagnetic field, comprising an oscillating circuit that receives, via a directional coupler, a high-frequency A.C. excitation voltage provided by an amplifier, wherein the oscillating circuit comprises at least one element of variable capacitance, and said terminal comprises, for modifying a capacitance value of said at least one element of variable capacitance according to an amplitude of a signal extracted from the directional coupler, a comparator comparing a voltage extracted from a coupled line of the directional coupler with a reference voltage selected to maintain an impedance of the oscillating circuit at a predetermined value.

2. The terminal of claim 1, wherein the oscillating circuit is formed of a capacitor, in series with an inductance and a resistor, the at least one element of variable capacitance comprising a MOS transistor, controlled by said comparator and connected in parallel with a series association of the inductance and of the resistor, a stray capacitance of the MOS transistor being used to modify a capacitance of the oscillating circuit.

3. The terminal of claim 1, wherein said directional coupler comprises discrete elements.

4. The terminal of claim 1, wherein the electromagnetic field remotely supplies at least one transponder.

5. A device for generating an electromagnetic field, comprising:
an oscillating circuit that receives, via a directional coupler, a high-frequency A.C. excitation voltage provided by an amplifier, wherein the oscillating circuit comprises at least one element of variable capacitance; and
a comparator for generating a control signal by comparing a voltage extracted from the directional coupler with a selected reference voltage, wherein the control signal is used for modifying a capacitance value of the at least one element of variable capacitance according to an amplitude of a signal extracted from the directional coupler to maintain an impedance of the oscillating circuit at a predetermined value.

6. A device for generating an electromagnetic field, comprising:
an oscillating circuit that receives an excitation voltage via a coupler, the oscillating circuit comprising at least one variable capacitance element; and
a comparator for modifying a capacitance value of the at least one variable capacitance element, the comparator comparing a voltage extracted from the coupler with a reference voltage, wherein the capacitance value is modified so as to maintain a desired impedance of the oscillating circuit.

7. The device of claim 6, wherein the comparator generates a control signal based at least partially on an amplitude of a signal extracted from the coupler.

8. The device of claim 6, wherein the comparator is a first comparator and the reference voltage is a first reference voltage, the device further comprising:
an amplifier for providing the excitation signal through the coupler; and
a second comparator for controlling a gain of the amplifier, the second comparator comparing the voltage extracted from the coupler with a second reference voltage.

9. The device of claim 6, wherein the desired impedance is predetermined.

10. The device of claim 6, wherein the desired impedance is associated with a resistance value of one or more components of the oscillating circuit.

11. The device of claim 6, wherein the desired impedance is associated with an output impedance of the coupler.

12. The device of claim 6, wherein the at least one variable capacitance element comprises a MOS transistor, and wherein a stray capacitance of the MOS transistor is modified based at least partially on an output of the comparator.

13. The device of claim 12, wherein the oscillating circuit comprises a resistor in series with an inductance, and wherein the MOS transistor is in parallel with the resistor and the inductance.

14. The device of claim 13, wherein the oscillating circuit further comprises a capacitor in series with the resistor and the inductance.

15. The device of claim 6, wherein a received signal is sampled from an output signal of a coupled line of the coupler.

16. The device of claim 6, wherein the oscillating circuit comprises a variable resistor whose resistance value is modified to control a quality factor that is independent of the desired impedance of the oscillating circuit.

17. The device of claim 6, wherein the coupler comprises discrete elements.

18. The device of claim 6, wherein the electromagnetic field supplies power to at least one transponder.

19. The device of claim 6, wherein the impedance of the oscillating circuit is maintained near a desired level associated with a resistance value of one or more components of the oscillating circuit.

20. The device of claim 6, wherein the impedance of the oscillating circuit is maintained near a desired level associated with an output impedance of the coupler.

21. A method for modifying an impedance of an oscillating circuit, the oscillating circuit comprising at least one variable capacitance element, the method comprising:

providing, via a coupler, an excitation voltage to the oscillating circuit;

generating a control signal at least in part by comparing a voltage extracted from the coupler with a reference voltage; and modifying a capacitance value of the at least one variable capacitance element according to the control signal.

22. The method of claim 21, wherein the control signal is generated based at least in part on an amplitude of a signal extracted from the coupler.

23. The method of claim 21, wherein the impedance of the oscillating circuit is maintained near a desired level.

* * * * *

UNITED STATES PATENT AND TRADEMARK OFFICE
CERTIFICATE OF CORRECTION

PATENT NO. : 7,603,082 B2
APPLICATION NO. : 11/165407
DATED : October 13, 2009
INVENTOR(S) : Jean-Pierre Enguent Page 1 of 1

It is certified that error appears in the above-identified patent and that said Letters Patent is hereby corrected as shown below:

Col. 5, line 4, should read:
ω designates the tuning pulse) independently from the Signed and Sealed this First Day of December, 2009

David J. Kappos
*Director of the United States Patent and Trademark Office*

UNITED STATES PATENT AND TRADEMARK OFFICE
CERTIFICATE OF CORRECTION

PATENT NO. : 7,603,082 B2  Page 1 of 1
APPLICATION NO. : 11/165407
DATED : October 13, 2009
INVENTOR(S) : Jean-Pierre Enguent It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1086 days.

Signed and Sealed this

Fifth Day of October, 2010

David J. Kappos
*Director of the United States Patent and Trademark Office*